United States Patent
Kwak et al.

(10) Patent No.: US 11,412,517 B2
(45) Date of Patent: Aug. 9, 2022

(54) METHOD FOR TRANSMITTING/RECEIVING DOWNLINK CONTROL INFORMATION AND DEVICE THEREFOR

(71) Applicant: LG Electronics Inc., Seoul (KR)

(72) Inventors: Kyuhwan Kwak, Seoul (KR); Seungmin Lee, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 82 days.

(21) Appl. No.: 16/959,821

(22) PCT Filed: Jan. 16, 2019

(86) PCT No.: PCT/KR2019/000647
§ 371 (c)(1),
(2) Date: Jul. 2, 2020

(87) PCT Pub. No.: WO2019/143127
PCT Pub. Date: Jul. 25, 2019

(65) Prior Publication Data
US 2020/0374881 A1  Nov. 26, 2020

Related U.S. Application Data

(60) Provisional application No. 62/634,716, filed on Feb. 23, 2018, provisional application No. 62/630,794, (Continued)

(51) Int. Cl.
*H04W 72/04* (2009.01)
*H04L 1/00* (2006.01)
(Continued)

(52) U.S. Cl.
CPC ....... *H04W 72/0466* (2013.01); *H04L 1/0061* (2013.01); *H04L 5/0016* (2013.01);
(Continued)

(58) Field of Classification Search
CPC .......... H04W 72/0466; H04W 72/042; H04W 72/1268; H04W 72/1289; H04L 1/0061; H04L 1/1896; H04L 5/0016; H04L 5/0048

See application file for complete search history.

(56) References Cited

U.S. PATENT DOCUMENTS 9,014,131 B2  4/2015  Yang et al.
2014/0307560 A1* 10/2014  Kim .................. H04L 5/001
                                                   370/241

(Continued)

FOREIGN PATENT DOCUMENTS

| EP | 2582074 | 4/2013 |
|----|---------|--------|
| KR | 101690895 | 12/2016 |
| WO | WO2017216605 | 12/2017 |

OTHER PUBLICATIONS

Extended European Search Report in European Appln. No. 19740779.4, dated Aug. 3, 2021, 8 pages.

(Continued)

*Primary Examiner* — Joshua Kading
(74) *Attorney, Agent, or Firm* — Fish & Richardson P.C.

(57) ABSTRACT

The present invention provides a method by which a terminal receives downlink control information (DCI) in a wireless communication system. Particularly, the method can acquire the DCI by detecting a plurality of first DCI candidates in a plurality of control resource block (RB) sets, descrambling a cyclic redundancy check (CRC) included in each of the plurality of first DCI candidates, and aggregating second DCI candidates, from among the plurality of first DCI candidates, descrambled on the basis of the same scrambling sequence.

19 Claims, 13 Drawing Sheets

Related U.S. Application Data filed on Feb. 14, 2018, provisional application No. 62/618,620, filed on Jan. 17, 2018.

(51) Int. Cl.
*H04W 72/12* (2009.01)
*H04L 5/00* (2006.01)
*H04L 1/18* (2006.01)

(52) U.S. Cl.
CPC ......... *H04L 5/0048* (2013.01); *H04W 72/042* (2013.01); *H04W 72/1268* (2013.01); *H04W 72/1289* (2013.01); *H04L 1/1896* (2013.01)

(56) References Cited

U.S. PATENT DOCUMENTS

| | | | | |
|---|---|---|---|---|
| 2016/0255609 | A1* | 9/2016 | Kim | H04B 7/0608 370/203 |
| 2018/0317198 | A1* | 11/2018 | Lee | H04L 5/0053 |
| 2019/0081820 | A1* | 3/2019 | Urabayashi | H04L 27/0006 |
| 2019/0312679 | A1* | 10/2019 | Jayasinghe | H04L 1/0038 |
| 2019/0335431 | A1* | 10/2019 | Wang | H04W 72/12 |
| 2020/0128576 | A1* | 4/2020 | Jung | H04W 72/0406 |
| 2021/0112528 | A1* | 4/2021 | Lee | H04L 1/0072 |

OTHER PUBLICATIONS

Intel Corporation, "General aspects for NR search space," R1-1704746, Presented at 3GPP TSG RAN WG1 Meeting #88, Spokane, USA, Apr. 3-7, 2017, 5 pages.

Catt, "Remaining issues on PDCCH search space," R1-1800249, 3GPP TSG RAN WG1 Meeting AH 1801, Vancouver, Canada, dated Jan. 22-26, 2018, 7 pages.

MediaTek Inc., "DCI Aggregation in 2-stage DCI," R1-1702723, 3GPP TSG RAN WG1 #88, Athens, Greece, dated Feb. 13-17, 2017, 5 pages.

PCT International Search Report and Written Opinion in International Application No. PCT/KR2019/000647, dated Apr. 22, 2019, 21 pages (with English translation).

* cited by examiner (A) CONTROL-PLANE PROTOCOL STACK (B) USER-PLANE PROTOCOL STACK (a) 1TX or 2TX (b) 4 TX

METHOD FOR TRANSMITTING/RECEIVING DOWNLINK CONTROL INFORMATION AND DEVICE THEREFOR

CROSS-REFERENCE TO RELATED APPLICATIONS

This application is a National Stage application under 35 U.S.C. § 371 of International Application No. PCT/KR2019/000647, filed on Jan. 16, 2019, which claims the benefit of U.S. Provisional Application No. 62/634,716, filed on Feb. 23, 2018, U.S. Provisional Application No. 62/630,794, filed on Feb. 14, 2018, and U.S. Provisional Application No. 62/618,620, filed on Jan. 17, 2018. The disclosures of the prior applications are incorporated by reference in their entirety.

TECHNICAL FIELD

The present disclosure relates to a method of transmitting and receiving downlink control information and an apparatus therefor and, more particularly, to a method of segmenting one downlink control information to transmit the segmented downlink control information through one or more control resource sets and decoding the downlink control information by receiving the segmented downlink control information, and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DETAILED DESCRIPTION OF THE DISCLOSURE

Technical Problems

The present disclosure provides a method of transmitting and receiving downlink control information and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of receiving downlink control information (DCI) by a user equipment in a wireless communication system, including detecting a plurality of first DCI candidates from a plurality of control resource block (RB) sets, descrambling a cyclic redundancy check (CRC) included in each of the first DCI candidates, and acquiring the DCI by aggregating second DCI candidates descrambled based on an equal scrambling sequence among the first DCI candidates.

The number of control channel elements (CCEs) constituting each of the second DCI candidates may be different.

Information related to a type of data scheduled by the DCI may be obtained based on the equal scrambling sequence.

The number of the second DCI candidates related to the DCI may be obtained based on the equal scrambling sequence.

Information about a type of the DCI may be obtained based on indexes of the second DCI candidates related to the DCI.

The second DCI candidates may be generated by attaching a CRC to each of segmented DCIs obtained by segmenting encoded DCI based on a size of each of the second DCI candidates.

The second DCI candidates may be generated by encoding the DCI in which the CRC is included based on a size of each of the second DCI candidates.

A length of the equal scrambling sequence may be a sum of a length of the CRC and a length of a virtual CRC included in a payload of the DCI.

A physical uplink control channel (PUCCH) resource related to data scheduled by the DCI may be determined based on a control RB set having a lowest index among the control RB sets.

According to an aspect of the present disclosure, provided herein is a communication device for receiving downlink control information (DCI) in a wireless communication system, including a memory; and a processor connected to the memory, wherein the processor detects a plurality of first DCI candidates from a plurality of control resource block (RB) sets, descrambles a cyclic redundancy check (CRC) included in each of the first DCI candidates, and acquires the DCI by aggregating second DCI candidates descrambled based on an equal scrambling sequence among the first DCI candidates.

According to an aspect of the present disclosure, provided herein is a method of transmitting downlink control information (DCI) by a base station in a wireless communication system, including segmenting the DCI into a plurality of DCI candidates, scrambling a cyclic redundancy check (CRC) included in the DCI candidates using an equal scrambling sequence, and mapping the DCI candidates to a plurality of control resource block (RB) sets and transmitting the DCI candidates.

The number of control channel elements (CCEs) constituting each of the DCI candidates may be different.

The equal scrambling sequence may be determined based on at least one of a type of data scheduled by the DCI or the number of the DCI candidates.

Indexes of the DCI candidates may be determined based on a type of the DCI.

Advantageous Effects

According to the present disclosure, the reliability of downlink control information received by a UE may be raised.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE DISCLOSURE

Figure 1:
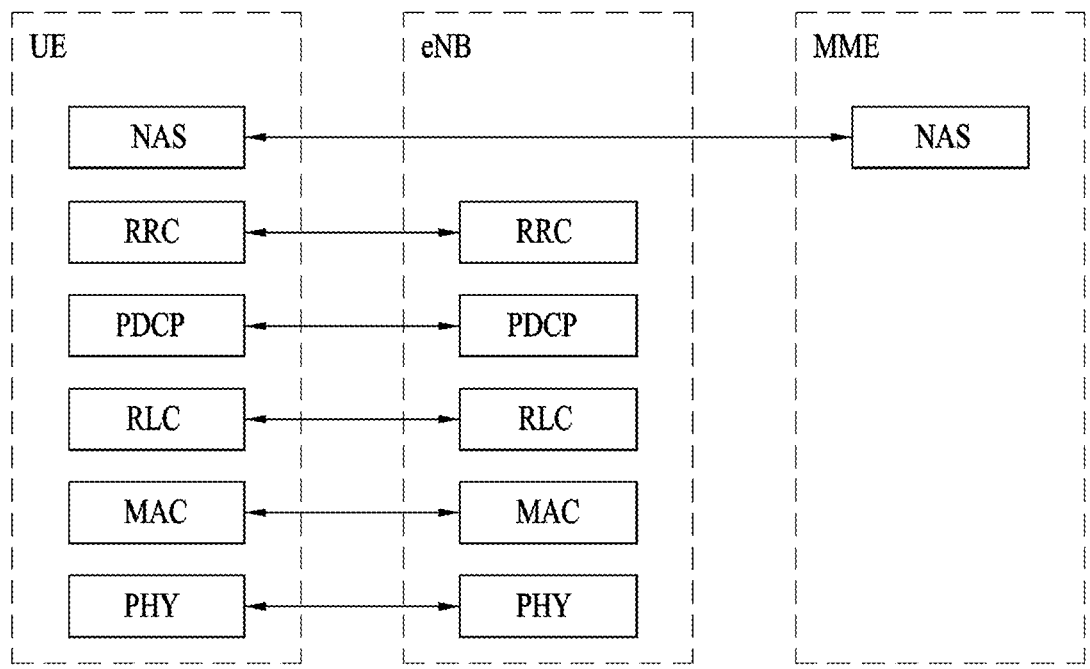
FIG. 1 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
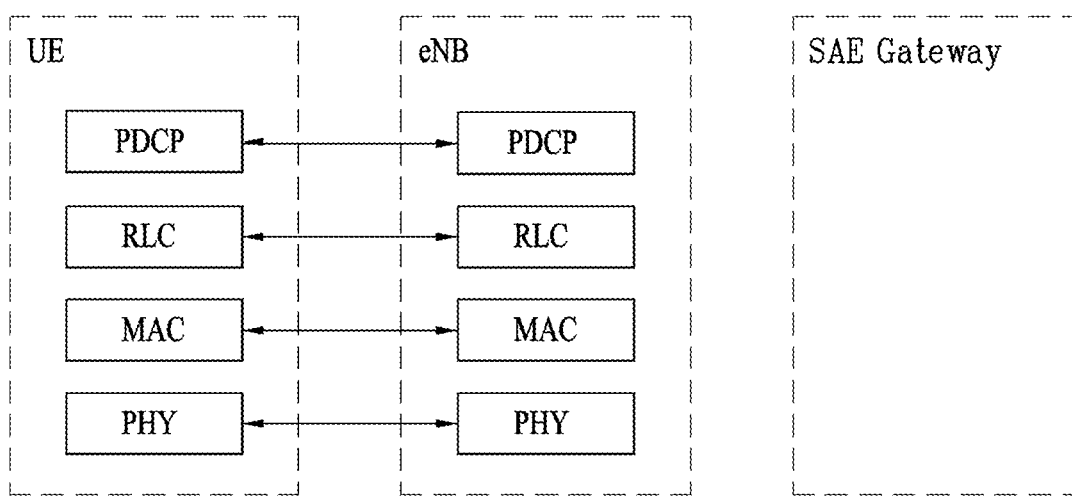

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
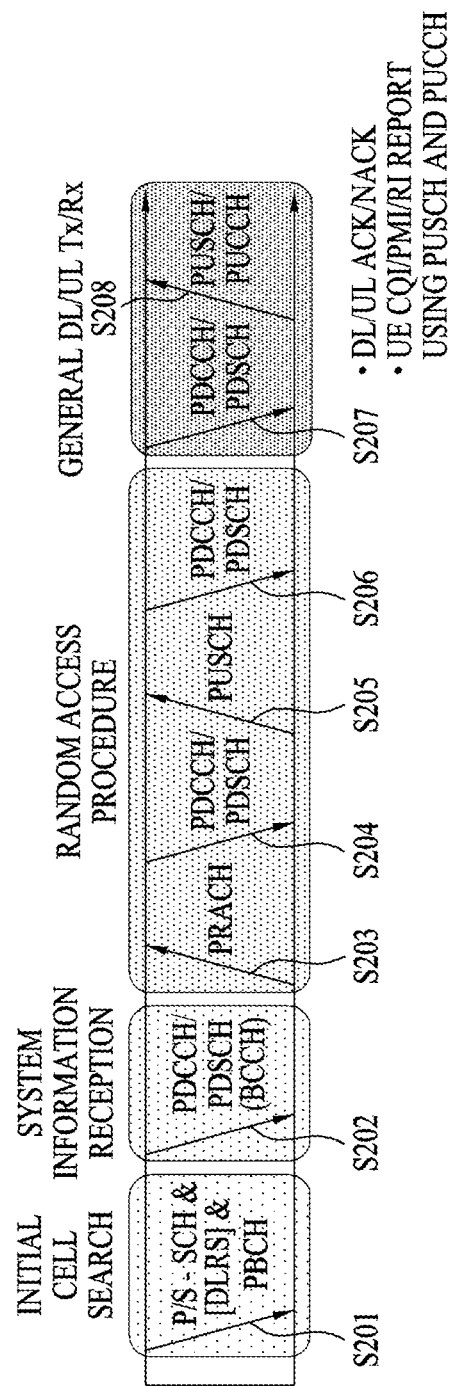
FIG. 2 is a view illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S—SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
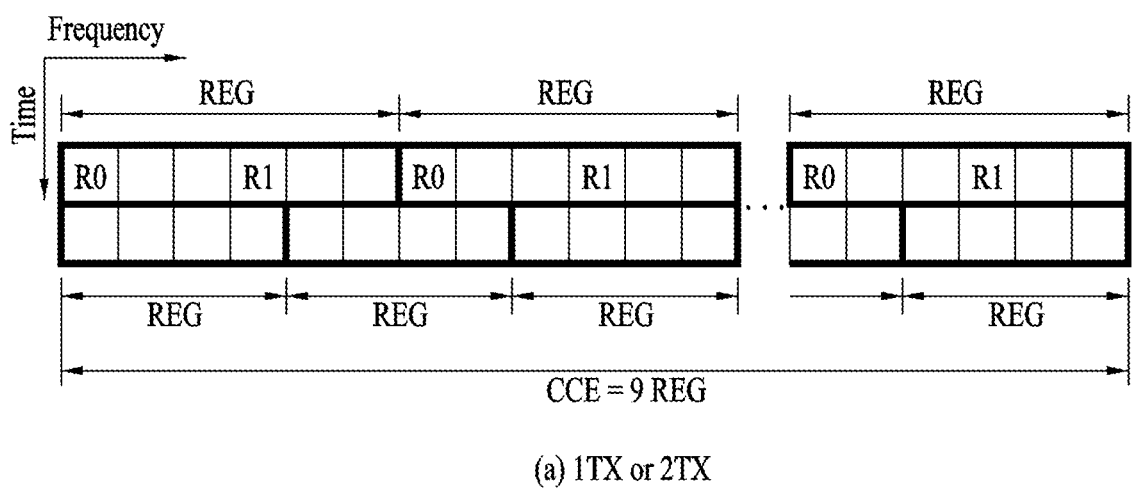
FIG. 3 illustrates resource units used to configure a DL control channel in the LTE system.
Figure 3:
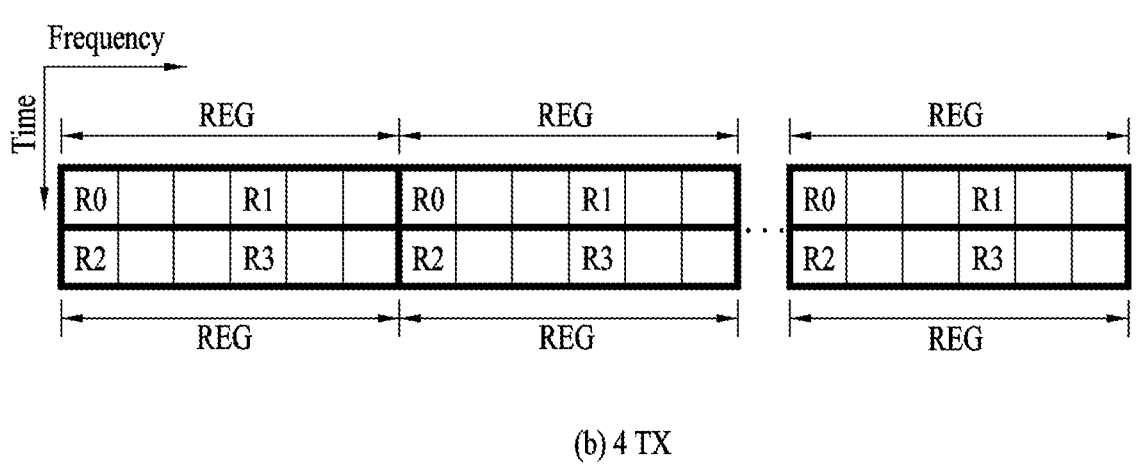

FIG. 3 illustrates resource units used to configure a DL control channel in LTE. FIG. 3(a) shows a case in which the number of transmit (Tx) antennas is 1 or 2 and FIG. 3(b) shows a case in which the number of Tx antenna is 4. Although a different RS pattern is used according to the number of Tx antennas, REs are configured for a DL control channel in the same manner.

Referring to FIG. 3, a basic resource unit of a DL control channel is an REG. The REG includes four contiguous REs except for REs carrying RSs. REGs are marked with bold lines in FIG. 3. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor M(L) (≥L) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

In Table 1, L is a CCE aggregation level, that is, the number of CCEs in a PDCCH, Sk(L) is a search space with CCE aggregation level L, and M(L) is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 4:
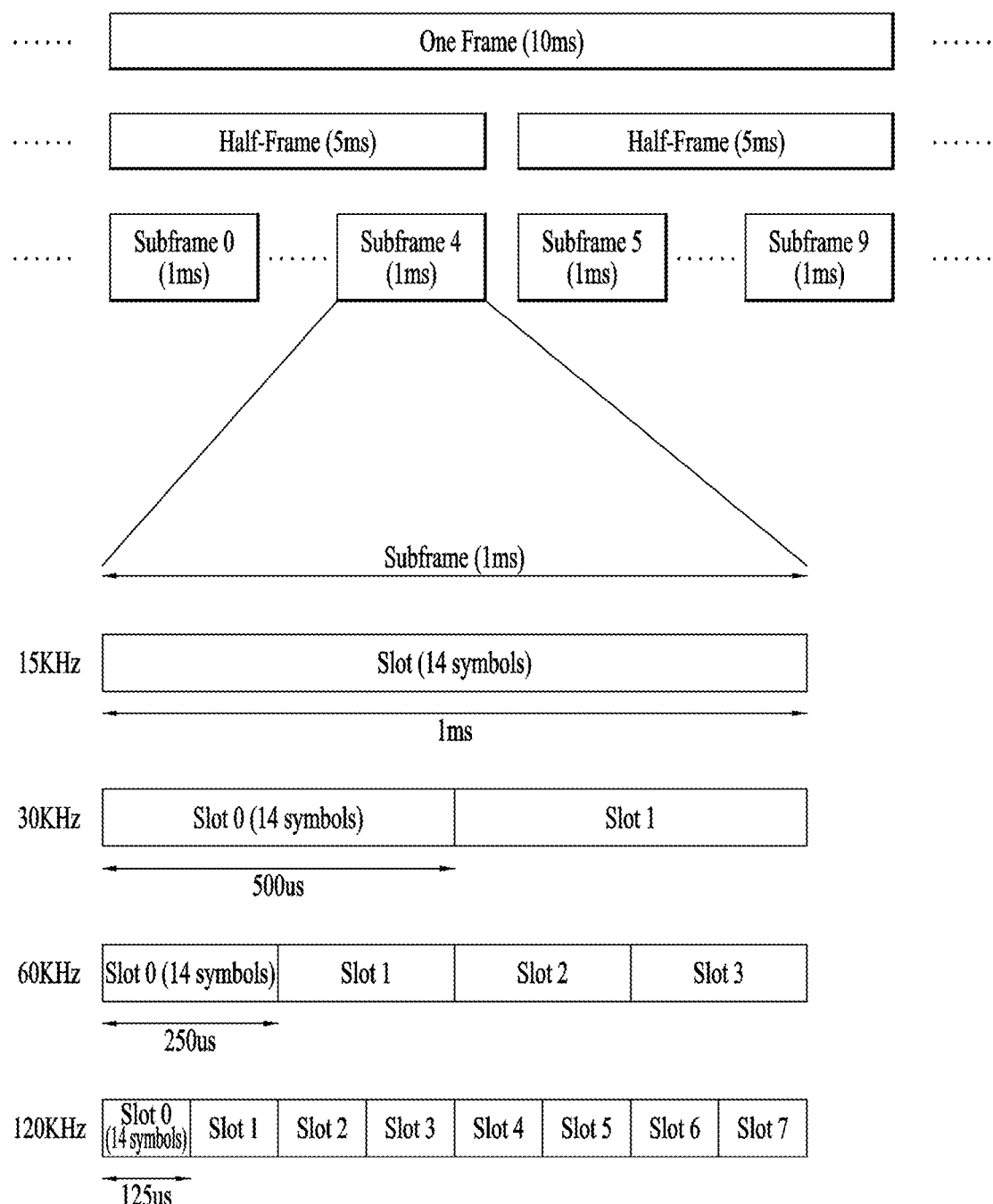
FIGS. 4 to 6 are views illustrating structures of a radio frame and slots used in the NR system.

FIG. 4 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 2] illustrates that the number of symbols per slot, the number of slots per frame, and the number of slots per subframe vary according to the SCS when the normal CP is used.

TABLE 2

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{subframe, u}_{slot}$: Number of slots in a subframe

[Table 3] illustrates that the number of symbols per slot, the number of slots per frame, and the number of slots per subframe vary according to the SCS when the extended CP is used.

TABLE 3

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 5:
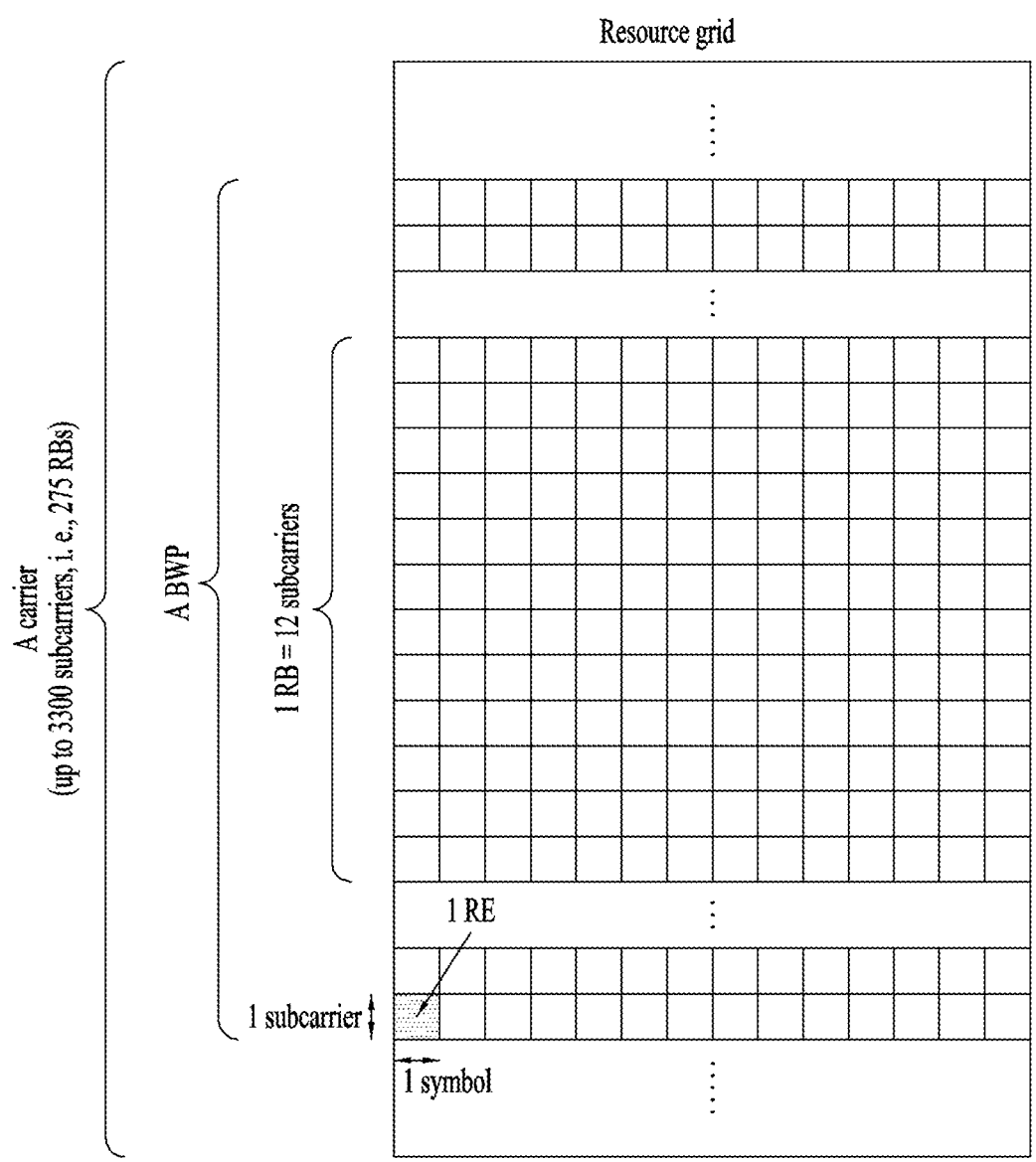

FIG. 5 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 6:
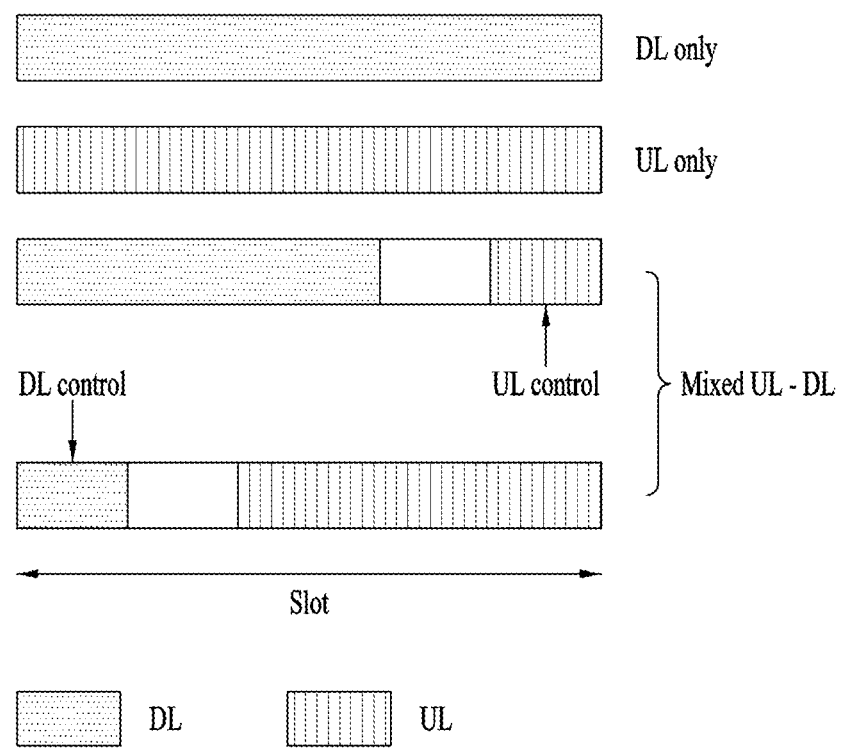

FIG. 6 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   –DL region+Guard period (GP)+UL control region
   –DL control region+GP+UL region
   *DL region: (i) DL data region, (ii) DL control region+DL data region
   *UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For NR system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

Figure 7:
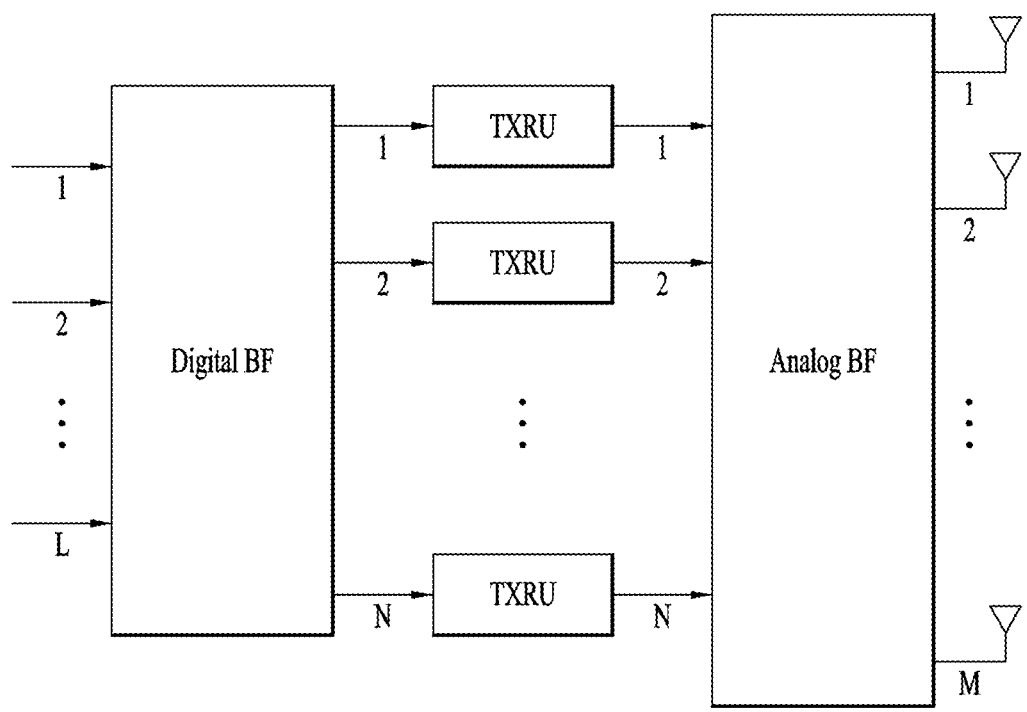
FIG. 7 is a view illustrating exemplary connection schemes between transceiver units (TXRUs) and antenna elements.

FIG. 7 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 7, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 8:
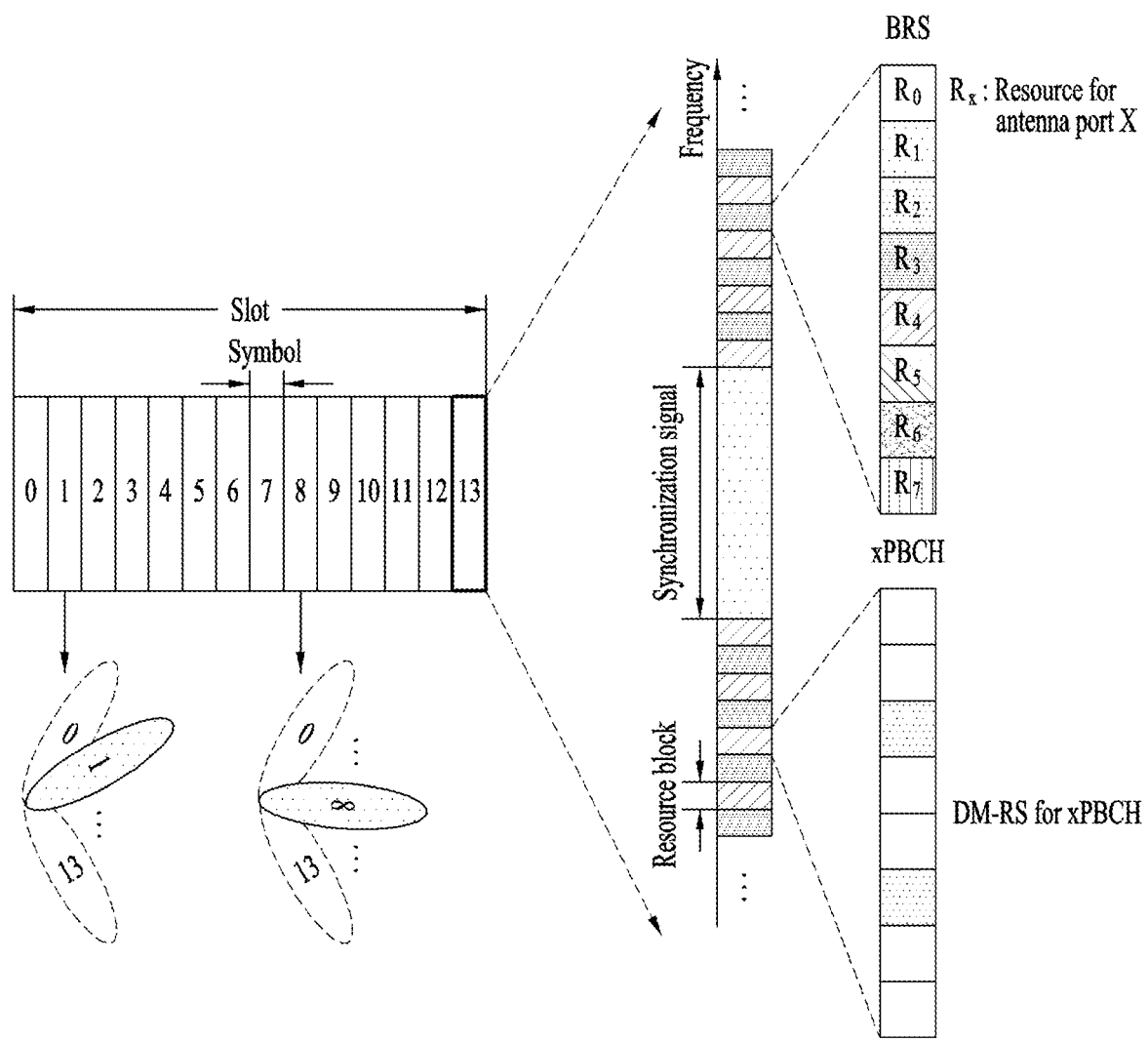
FIG. 8 is a view illustrating beam sweeping for a synchronization signal and system information during downlink (DL) transmission.

FIG. 8 is a view illustrating beam sweeping for an SS and system information during DL transmission. In FIG. 8, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 8 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 9:
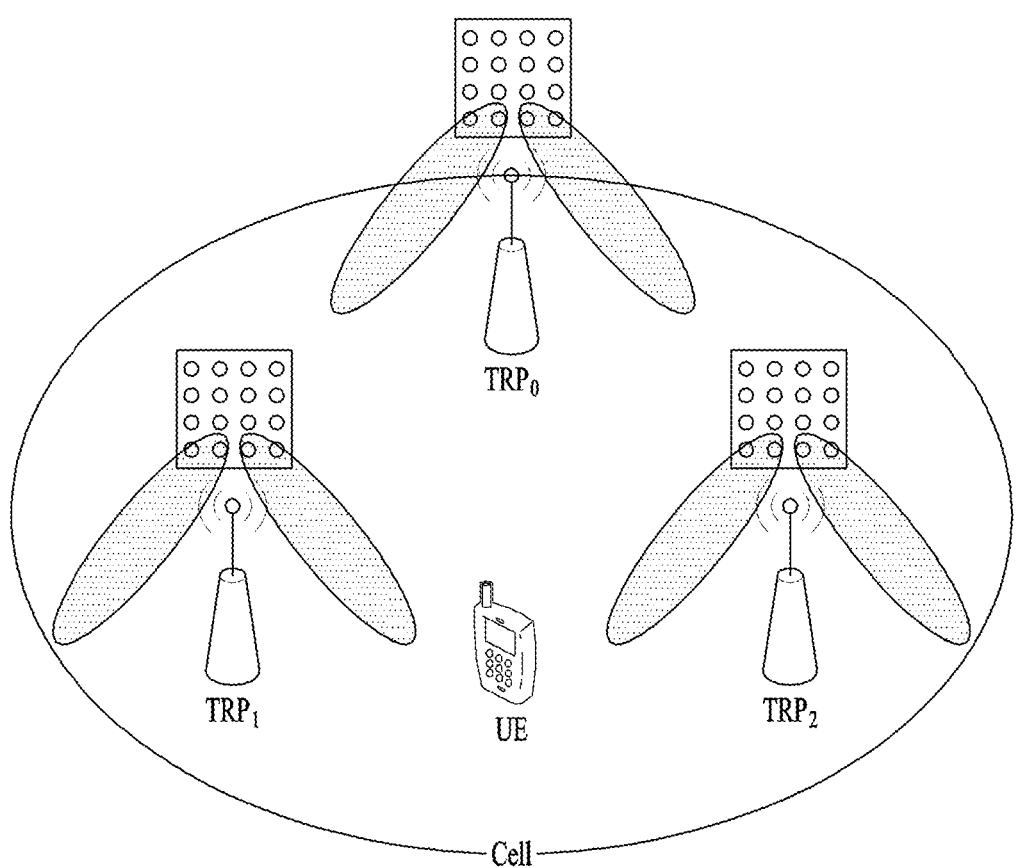
FIG. 9 is a view illustrating an exemplary cell in an NR system.

FIG. 9 is a view illustrating an exemplary cell in the NR system.

Referring to FIG. 9, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Now, embodiments of a method of transmitting and receiving DCI according to the present disclosure will be described.

Upon transmitting and receiving information in a next-generation communication system including a fifth-generation NR system, methods for achieving very short delay and very high reliability are under consideration. To this end, it is necessary to consider a method of configuring various target quality of service (QoS) requirements such as latency and/or reliability and efficiently providing services satisfying a corresponding QoS requirement by performing a different operation according to each target QoS requirement.

Accordingly, the present disclosure intends to propose methods of efficiently transmitting DCI in a communication system designed to reduce latency and raise reliability.

Although inventive subject matters and/or embodiments of the present disclosure may be regarded as one proposed scheme, a combination of the inventive subject matters and/or the embodiments may also be regarded as a new scheme. In addition, it is apparent that a specific inventive subject matter is not limited to a specific embodiment or a specific system proposed in the present disclosure.

As a method for raising the reliability of DCI in a system, a method of lowering a code rate by repeatedly transmitting DCI candidates and then combining the candidates or raising an aggregation level (AL) may be considered.

In this case, a method of applying embodiments of the present disclosure while applying a transmission structure in a legacy system in consideration of coexistence with the legacy system may be considered. For example, when taking into consideration an environment operating in a shortened transmission time interval (sTTI) in an LTE system, one or more control RB sets may be configured on a DL channel and one or more control channel elements (CCEs) each consisting of plural resource element groups (REGs) in each control RB set may be aggregated, so that DCI candidates corresponding to each AL may be configured to transmit DCI through the DCI candidates. In this case, the number of DCI candidates per AL may be indicated to the UE by the eNB through higher layer signaling.

In addition, in order to increase the reliability of DCI transmission, a method of aggregating one or more DCI candidates in one or more control RB sets may be considered. In this case, when one or more DCI candidates are aggregated in one or more control RB sets, the control RB sets may be included in the same TTI or may be included in different TTIs. That is, aggregation between DCI candidates of one or more control RB sets configured at the same timing may be performed or aggregation between DCI candidates of one or more control RB sets configured at different timings may be performed. Furthermore, aggregation between DCI candidates corresponding to different ALs may be performed.

Here, two schemes may be broadly considered as the method of aggregating one or more DCI candidates. For example, each of the DCI candidates may include a cyclic redundancy check (CRC) or the CRC may be attached only to one of the one or more DCI candidates that are aggregated. In the present disclosure, legacy may mean non-URLLC. For example, a legacy UE may mean a UE that does not support URLLC transmission and reception.

Figure 11:
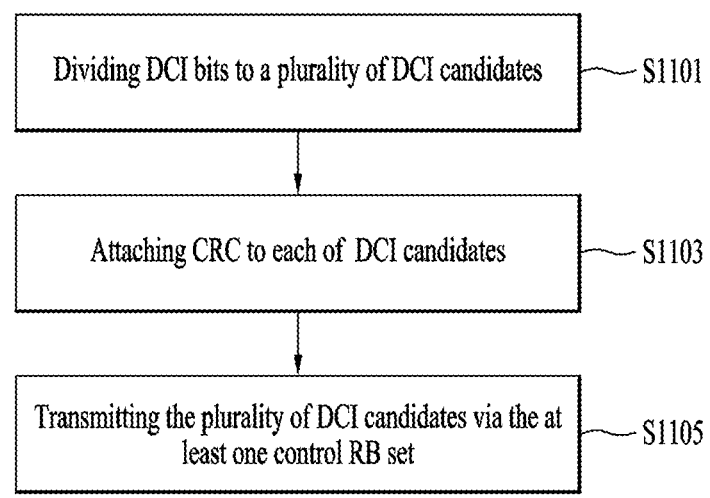
Figure 12:
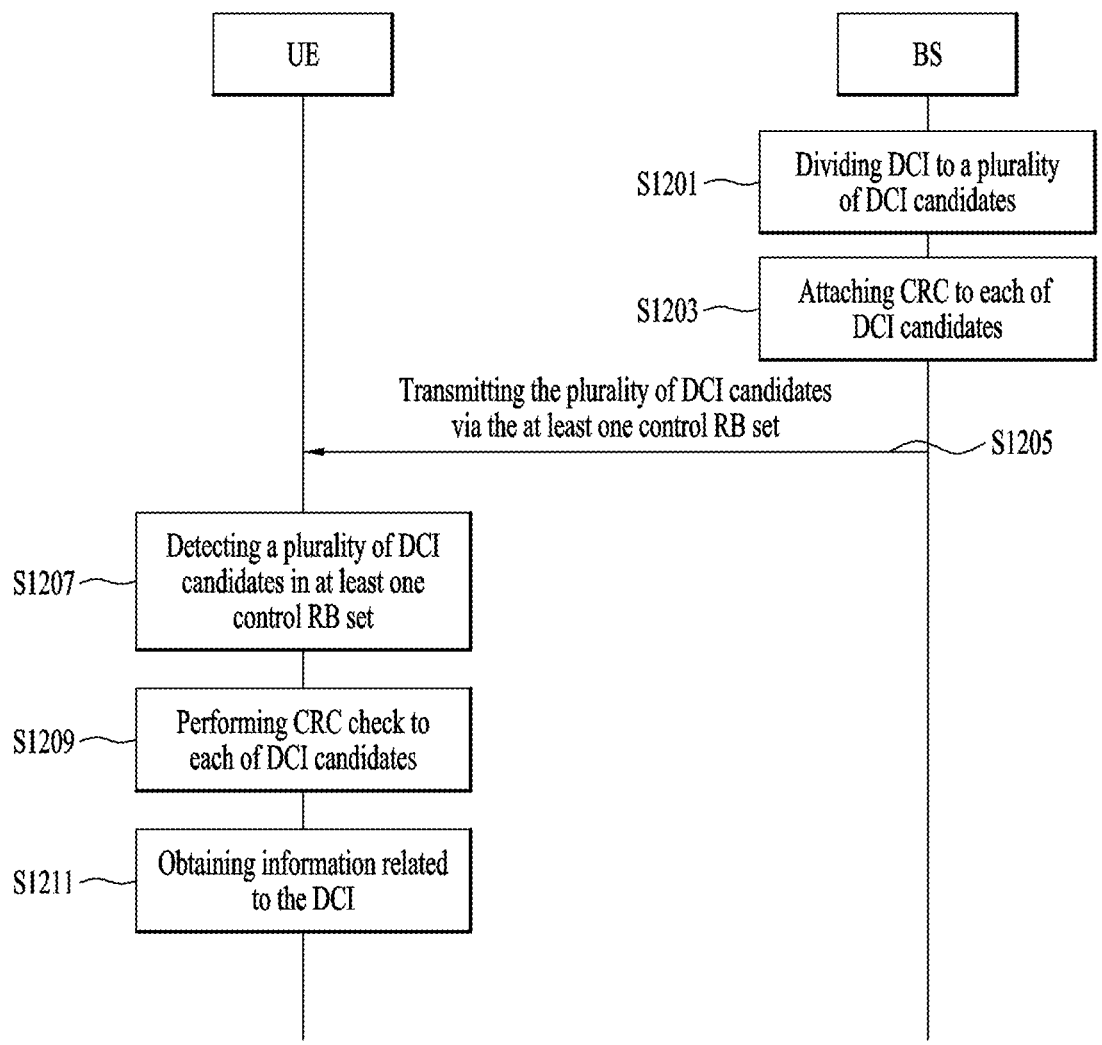

Prior to description of each scheme, a DCI transmission method performed by applying each scheme and operations of the UE and the eNB according to the method will be described with reference to FIGS. 10 to 12.

Figure 10:
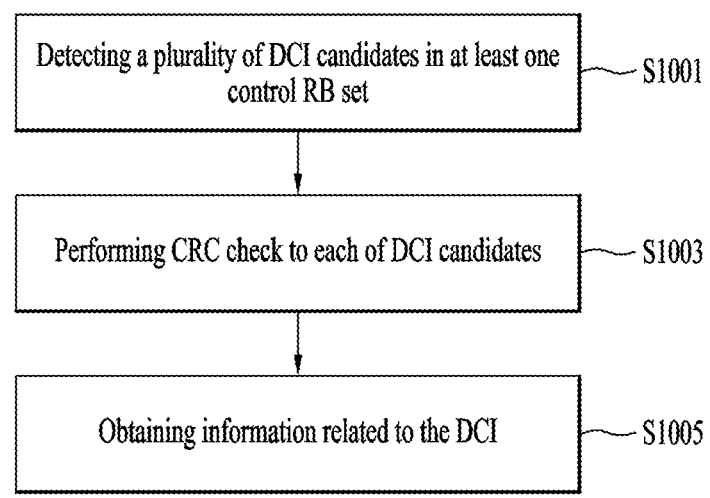
FIGS. 10 to 12 are flowcharts for explaining operations of a UE and an eNB according to embodiments of the present disclosure.

FIG. 10 is a view for explaining the operation of the UE according to an embodiment of the present disclosure.

Referring to FIG. 10, the UE detects a plurality of DCI candidates from one or more control RB sets. In this case, the DCI candidates may be obtained by segmenting bits for DCI transmission into the DCI candidates. The bits for DCI transmission may be bits for single DCI or may be bits for multiple DCIs (S1001).

Next, the UE performs CRC check for the detected DCI candidates. In this case, a CRC may be attached to each of the DCI candidates so that the UE may perform CRC check for each of the DCI candidates, or the CRC may be attached to each DCI so that the UE may perform CRC check for DCI candidates constituting single DCI (S1003).

If DCI is successfully decoded through CRC check, the UE may obtain information related to the DCI based on the decoding result. In this case, the information related to the DCI may be scheduling information transmitted through the DCI or may be additional information obtained through CRC check. The additional information will be described later in detail (S1005).

Now, an operation process of the eNB according to the present disclosure will be described with reference to FIG. 11. The eNB segments bits for DCI transmission into a plurality of DCI candidates. In this case, the bits for DCI transmission segmented into the DCI candidates may be bits for single DCI or bits for multiple DCIs (S1101).

A CRC may be attached to each DCI. In this case, one CRC may be attached to each DCI or may be attached to each of the DCI candidates. If one CRC is attached to each DCI, the CRC may be attached to one DCI candidate of the DCI candidates corresponding to single DCI (S1103).

Next, the DCI candidates are mapped to one or more control RB sets and then are transmitted to the UE (S1105).

The above-described operation of an entire network including the UE and eNB will now be described again with reference to FIG. 12. The eNB segments bits for DCI transmission into a plurality of DCI candidates (S1201) and attaches a CRC to one of the DCI candidates corresponding to single DCI or to each of the DCI candidates (S1203). Next, the DCI candidates are mapped to one or more control RB sets and transmitted to the UE (S1205).

The UE detects the DCI candidates from the one or more control RB sets (S1207) and performs CRC check upon the detected DCI candidates (S1209). If the UE successfully decodes DCI through CRC check, the UE may obtain scheduling information through DCI or information related to the DCI through CRC check (S1211). In this case, examples of detailed information that the UE may obtain through CRC check may conform to embodiments described later.

In addition, detailed embodiments of a method for transmitting DCI through one or more control RB sets and a method for receiving the same, that is, detailed embodiments for S1001 to S1005, S1101 to S1103, and S1201 to S1211, may conform to embodiments described below.

Now, detailed embodiments for performing the operation of S1001 to S1005, S1101 to S1103, and S1201 to S1211 will be described.

First, the case in which each of DCI candidates includes a CRC will be described. In this case, DCI bits are encoded considering only the size of a single DCI candidate, and the CRC may be attached and mapped to each DCI candidate based on the size of a single DCI candidate. DCI may be repeatedly transmitted as many times as the number of DCI candidates to which the CRC is mapped.

In addition, DCI bits are encoded in consideration of the total size of one or more aggregated DCI candidates and segmented in consideration of the size of each DCI candidate. Then, a CRC may be mapped to each segmented DCI candidate.

On the other hand, when each DCI candidate includes a CRC, a DCI bit to which a CRC is attached may be encoded to match the size of each DCI candidate and mapped to a corresponding DCI candidate. In this case, the DCI bit mapped to each DCI candidate may be the same information or different information.

In addition, total DCI bits to which the CRC is attached are encoded based on the total size of one or more aggregated DCI candidates. Thereafter, the total encoded bits are segmented to match the size of each DCI candidate and mapped to each DCI candidate.

This scheme may be applied in order to perform DCI transmission with higher reliability for URLLC traffic and may operate based on an sTTI to reduce latency.

In this case, the eNB may indicate, to the UE, through higher layer signaling and/or physical layer signaling, information about whether to perform the DCI candidate aggregation operation, the number of aggregated DCI candidates, an AL of aggregated DCI candidates, whether to apply aggregation between DCI candidates included in different control RB sets, whether aggregation between DCI candidates of different sizes is possible, and/or whether an encoded DCI bit is mapped to a single DCI candidate or multiple DCI candidates. Here, some or all of the above items may be configured in a predefined form in a system.

When the above items are indicated through higher layer signaling and/or physical layer signaling, for example, the eNB may instruct the UE to aggregate two DCI candidates while instructing the UE to perform aggregation for DCI candidates or indicate that the aggregated DCI candidates are DCI candidates included in AL 2 and AL 4.

In this case, an AL in which DCI candidates are included may be indicated in the form of an AL set. The AL set may be predefined in the system or the eNB may inform the UE of the AL set through higher layer signaling and/or physical layer signaling.

However, when different types of DCI such as DL/UL DCI or TTI/sTTI DCI are distinguished with the same size through a flag field, it is necessary to pre-distinguish between DCI candidates that may be aggregated with respect to each type.

For example, in the DCI candidates included in the AL 2 and the AL in the above embodiment, the eNB may pre-indicate that a half with low indexes among a total of DCI candidates configured for a corresponding AL will be transmitted for DL and the other half will be transmitted for UL. This may be configured using the number of DCI candidates or the ratio of DCI candidates. When the ratio is used, if the ratio between DCI candidates for DL and DCI candidates for UL is not exactly divided, a floor function may be applied.

On the other hand, such a configuration may be indicated by the eNB to the UE through higher layer signaling and/or physical layer signaling or may be predefined in the system. However, in the above-described embodiment, it may be difficult to change the configuration dynamically and there is a problem in that scheduling flexibility may be lowered or the number of blind decoding operations may increase.

Accordingly, in order to solve the above problem, the eNB may allocate a radio network temporary identifier (RNTI) for URLLC to a URLLC UE or apply an additional scrambling sequence to CRC masking. In this case, the UE may perform de-masking with the RNTI for URLLC or with the additional scrambling sequence without additional explicit indication from the eNB. If a DCI candidate has passed CRC check, the UE may recognize that the corresponding candidate is for URLLC traffic.

As described above, the UE may perform de-masking with the RNTI for URLLC or with the additional scrambling sequence and perform DCI candidate aggregation between DCI candidates that have passed CRC check. Here, whether the DCI candidates are aggregated may be predefined in the system or the eNB may inform the UE through higher layer signaling and/or physical layer signaling.

However, when different types of DCI are transmitted, a method of distinguishing therebetween is needed. To this end, CRC masking may be performed using an additional scrambling sequence generated based on a DCI type in addition to the RNTI for URLLC so that DCI candidate aggregation may be performed by distinguishing between DCI types.

In this case, information about whether to perform DCI candidate aggregation, the type of DCI, the number of times of repetitive transmission in units of DCI candidates when DCI candidate aggregation is performed, the number of DCI candidates used for DCI candidate aggregation, whether aggregation between different control RB sets is performed, and/or whether an encoded DCI bit is mapped to a single DCI candidate or multiple DCI candidates, may be indicated through the additional scrambling sequence. In addition, when the DCI is repeatedly transmitted at different timings, i.e., in different TTIs, information about how many times the DCI is repeatedly transmitted may also be transmitted through the scrambling sequence.

When the sizes of DCIs corresponding to different traffic types are the same, information about the traffic type of corresponding DCI may be transmitted by performing CRC masking using the scrambling sequence.

Through this method, the traffic type of DCI may be distinguished even without inserting a 1-bit flag for distinguishing the traffic type of the DCI into the DCI. Then, the reliability of DCI transmission may be raised by lowering the code rate of the DCI. Some or all of the information obtainable through the above-described scrambling sequence may be in a predefined form in the system.

This method is effective in that operation may be performed using only an additional scrambling sequence even if the RNTI for URLLC is not separately allocated. In other words, a legacy C-RNTI may be used without using the RNTI for URLLC and only the additional scrambling sequence may be used, so that additional information may be obtained without a flag for explicitly providing the additional information.

Meanwhile, a diversity effect may be obtained by performing CRC check for DCI candidates segmented from the same DCI and combining the DCI candidates and reliability may be raised by lowering a code rate. On the other hand, when CRC check for DCI candidates for each of different DCIs is performed using the same scrambling sequence or the same RNTI, if CRC check is successful, information about the different DCIs may be obtained simultaneously, thereby lowering detection complexity and achieving the same effect as the reduction of latency of information transmission.

An operation corresponding to each scrambling sequence may be predefined in the system or the eNB may inform the UE of the operation through higher layer signaling and/or physical layer signaling. In addition, the scrambling sequence to be used for the DCI, information about the operation corresponding to the scrambling sequence, and/or information corresponding to the scrambling sequence may be predefined in the system or indicated by the eNB to the UE through higher layer signaling and/or physical layer signaling. Here, the length of the scrambling sequence may be the same as or different from the length of the CRC. Scrambling may be applied to a data portion other than the CRC.

When a partial field of a payload is used as a virtual CRC or transmitted as a predefined value, if masking using the scrambling sequence is performed, the length of the scrambling sequence is defined as the sum of the length of the CRC and the length of the virtual CRC and masking may also be applied to all of the CRC and the virtual CRC.

Through this operation, the UE may reduce decoding complexity by combining and simultaneously decoding aggregated DCI candidates without decoding the payload of DCI candidates to the end. In addition, since there is no need for an explicit DCI bit for indicating the operation, additional blind decoding may be reduced and the above-described operations may be indicated dynamically by an implicit method.

Second, the case in which DCI is transmitted after a CRC is attached only to one DCI candidate among one or more aggregated DCI candidate will be described. In this case, since CRC check may not be performed upon each DCI candidate, the required number of blind decoding operations of the UE may increase. Therefore, it is necessary to consider an operation for reducing the number of blind decoding operations.

First, the eNB may inform the UE, through higher layer signaling and/or physical layer signaling, of information about whether to perform DCI candidate aggregation, whether to perform DCI candidate aggregation between different control RB sets, the number of DCI candidates for aggregation, DCI candidate placement order while decoding is performed, whether to perform aggregation between DCI candidates of different sizes, 'an AL and/or an AL set' to which aggregated DCI candidates belong, and/or whether an encoded DCI bit is mapped to a single DCI candidate or multiple DCI candidates. Some or all of the above items may be predefined in the system. In the case in which there is a URLLC dedicated UE, DCI candidate aggregation to be performed may be basically predefined in the system.

If DCI candidate aggregation between control RB sets is configured to be performed, a DCI candidate index of the other control RB set may be pre-mapped based on DCI candidate index of one RB set. For example, DCI candidate #0 of control RB set 1 and DCI candidate #0 of control RB set 2 may be mapped as a pair.

This mapping method may be predefined in the system according to the number of aggregated DCI candidates and/or whether to perform aggregation between DCI candidates of different sizes. Alternatively, the eNB may indicate the mapping method to the UE through higher layer signaling and/or physical layer signaling.

If DCI candidate aggregation is configured to be performed only within a single control RB set, the aggregated DCI candidates may be mapped within a single control RB set, similarly to the case of performing DCI candidate aggregation between control RB sets, according to the number of aggregated DCI candidates and/or according to whether aggregation between DCI candidates of different sizes may be performed. This mapping relationship may be indicated by the eNB to the UE through higher layer signaling and/or physical layer signal or may be predefined in the system.

For example, when only aggregation between DCI candidates of the same size within a single control RB set is configured and aggregation between two DCI candidates is configured, mapping may be performed such that aggregation between two DCIs having indexes as distant as possible from each other among DCI candidates allocated within each AL is performed. The above mapping method may be differently configured according to whether the single control RB set is a CRS-based control RB set or a DMRS-based control RB set.

The number of times of repetitive transmission of data may also be indicated through a CRC masking scheme using the scrambling sequence. This may be applied to both the case in which a CRC is attached only to one of the aggregated DCI candidates and the case in which the CRC is attached to each of the aggregated DCI candidates.

For example, when the eNB informs the UE of the number of times of repetitive data transmission corresponding to each scrambling sequence through higher layer signaling and/or physical layer signaling and when CRC check is successful through a CRC de-masking process, data decoding may be attempted as many times as the number of times of data repetition corresponding to the corresponding scrambling sequence. Here, the number of times of data repetition may indicate the number of times of repetition on the time axis such as a TTI and/or the number of times of repetition on the frequency axis.

A CQI table used when the URLLC UE reports a CQI through a CRC masking method using a scrambling sequence may be designated or an MCS related table designated through a DCI field may be designated.

On the other hand, when DCI is repeatedly transmitted, a method of implicitly designating a transmission resource of HARQ-ACK for data scheduled by the DCI is needed.

For example, when DL data is transmitted through the DCI and HARQ-ACK for the DCI is transmitted, a resource on which the corresponding HARQ-ACK is transmitted may be implicitly designated. In the case of a legacy PDCCH, a PUCCH resource on which HARQ-ACK for the data is to be transmitted is determined based on the lowest CCE index of DCI that has scheduled specific data.

However, when the control RB set is allocated differently according to the UE as in the present disclosure, logical indexes in a search space, such as CCE indexes, may overlap.

Therefore, a PUCCH resource may be determined using the lowest index among physical resource indexes corresponding to a plurality of aggregated DCI candidates. That is, the PUCCH resource may be determined based on a resource having the lowest index among physical resources to which the aggregated DCI candidates are mapped. In this case, the physical resource indexes may be RB indexes.

In addition, when encoding is performed upon each DCI candidate, if different redundancy version (RV) values are repeatedly transmitted, the PUCCH resource may be determined based on a physical resource having the lowest index among physical resource indexes corresponding to DCI candidates having the lowest RV value.

Figure 13:
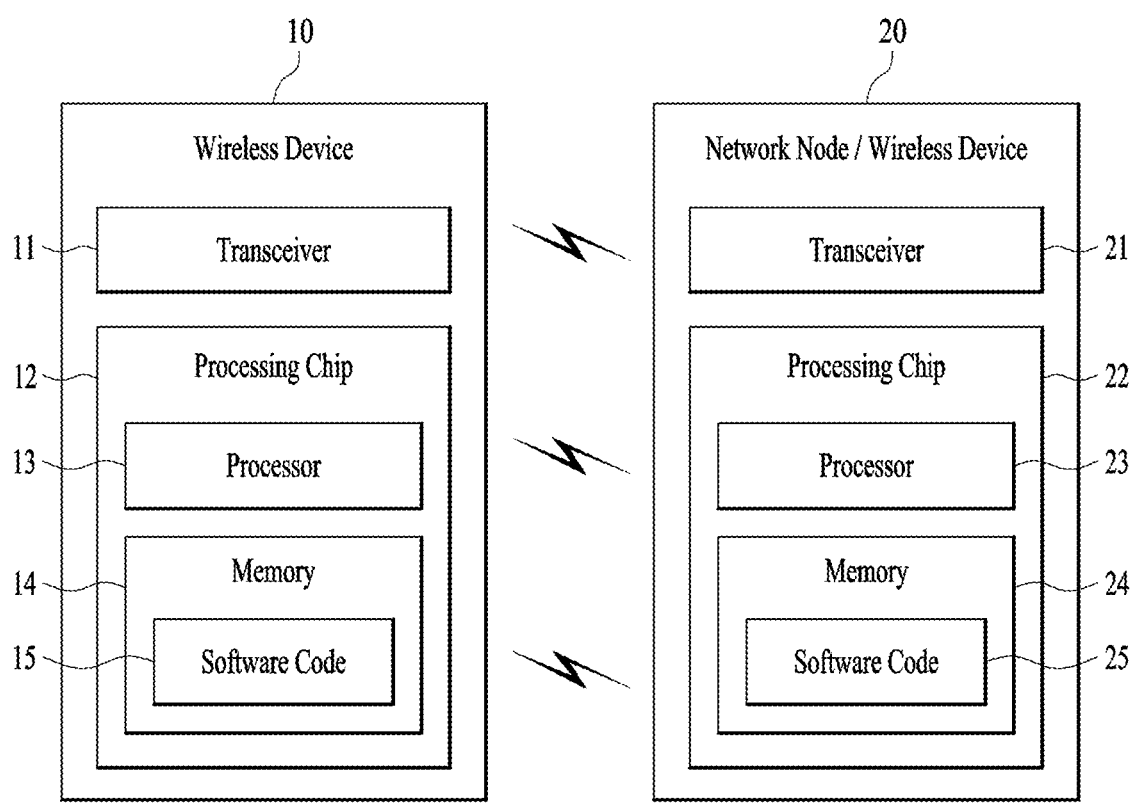
FIG. 13 is a block diagram of wireless devices for implementing the present disclosure.

FIG. 13 is a block diagram illustrating an example of communication between a wireless device 10 and a network node 20. Here, the network node 20 may be replaced with the wireless device of FIG. 13 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present invention. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present invention, the transceivers 11 and 21 may support reception beamforming and transmission beamforming. For example, in the present invention, the transceivers 11 and 21 may be configured to perform the functions illustrated in FIGS. 7 to 9.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 13 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include Nt transmit antennas (where Nt is a positive integer greater than or equal to 1).

In addition, the processing chips 12 and 22 include a memory 14, 24 configured to store data, programmable software code, and/or other information for implementing the embodiments described herein.

In other words, in the embodiments according to the present invention, when the memories 14 and 24 are executed by at least one processor, such as the processors 13 and 23, the memories allow the processors 13 and 23 to execute some or all of the processes controlled by the processors 13 and 23 of FIG. 13, or store software codes 15 and 25 including instructions for implementing the embodiments described herein based on FIGS. 1 to 12.

Specifically, the processing chip 12 of the wireless device 10 according to an embodiment of the present disclosure detects a plurality of DCI candidates through one or more control RB sets. In this case, the DCI candidates are obtained by segmenting bits for DCI transmission. The bits for DCI transmission may be bits for single DCI or bits for multiple DCIs.

Next, the processing chip 12 performs CRC check for the detected DCI candidates. In this case, a CRC may be attached to each of the DCI candidates so as to perform CRC check for each of the DCI candidates or the CRC may be attached to each DCI so as to perform CRC check for DCI candidates constituting single DCI. A detailed method in which the DCI candidates are mapped to one or more control RB sets and transmitted may conform to the above-described embodiments.

If decoding for DCI is successful through CRC check, the processing chip 12 may obtain information related to the DCI based on the decoding result. In this case, the information related to the DCI may be scheduling information transmitted through the DCI or may be additional information obtained through CRC check. The additional information may be various information acquired implicitly through a de-scrambling or de-masking process as described in the above-described embodiments.

The processing chip 22 of the network node 20 according to an embodiment of the present disclosure segments bits for DCI transmission into a plurality of DCI candidates. In this case, the bits for DCI transmission segmented into the DCI candidates may be bits for single DCI or bits for multiple DCIs.

In addition, the processing chip 22 attaches a CRC for each DCI. In this case, one CRC may be attached to each DCI or the CRC may be attached to each of the DCI candidates. If one CRC is attached to each DCI, the CRC may be attached to one DCI candidate of the DCI candidates corresponding to single DCI. When scrambling the CRC, a scrambling sequence and an RNTI for scrambling the CRC may serve to implicitly transmit specific information to the UE. The RNTI and the scrambling sequence may be selected according to information to be transmitted by the processing chip 22. The information that may be transmitted according to the scrambling sequence and the RNTI may conform to the above-described embodiments.

Next, the processing chip 22 controls the processor to map the DCI candidates to one or more control RB sets and transmit the same to the UE. A detailed method of mapping the DCI candidates to one or more control RB sets and transmitting the DCI candidates may conform to the above-described embodiments.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or gNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method of transmitting and receiving DCI and the apparatus therefor have been described in the context of the 5G NewRAT system, they are also applicable to various other wireless communication systems than the 5G NewRAT system.

What is claimed is:
1. A method of receiving downlink control information (DCI) by a user equipment in a wireless communication system, the method comprising:
    detecting a plurality of first DCI candidates from a plurality of control resource block (RB) sets;
    descrambling a cyclic redundancy check (CRC) included in each of the first DCI candidates; and
    acquiring the DCI by aggregating second DCI candidates descrambled based on an equal scrambling sequence among the first DCI candidates,
    wherein the number of the second DCI candidates related to the DCI is obtained based on the equal scrambling sequence.
2. The method of claim 1,
    wherein the number of control channel elements (CCEs) constituting each of the second DCI candidates is different.
3. The method of claim 1,
    wherein information related to a type of data scheduled by the DCI is obtained based on the equal scrambling sequence.
4. The method of claim 1,
    wherein information about a type of the DCI is obtained based on indexes of the second DCI candidates related to the DCI.

5. The method of claim 1,
wherein the second DCI candidates are generated by attaching a CRC to each of segmented DCIs obtained by segmenting encoded DCI based on a size of each of the second DCI candidates.

6. The method of claim 1,
wherein the second DCI candidates are generated by encoding the DCI in which the CRC is included based on a size of each of the second DCI candidates.

7. The method of claim 1,
wherein a length of the equal scrambling sequence is a sum of a length of the CRC and a length of a virtual CRC included in a payload of the DCI.

8. The method of claim 1,
wherein a physical uplink control channel (PUCCH) resource related to data scheduled by the DCI is determined based on a control RB set having a lowest index among the control RB sets.

9. A communication device for receiving downlink control information (DCI) in a wireless communication system, the communication device comprising:
a memory; and
a processor connected to the memory,
wherein the processor:
  detects a plurality of first DCI candidates from a plurality of control resource block (RB) sets,
  descrambles a cyclic redundancy check (CRC) included in each of the first DCI candidates, and
  acquires the DCI by aggregating second DCI candidates descrambled based on an equal scrambling sequence among the first DCI candidates,
  wherein the number of the second DCI candidates related to the DCI is obtained based on the equal scrambling sequence.

10. The communication device of claim 9,
wherein the number of control channel elements (CCEs) constituting each of the second DCI candidates is different.

11. The communication device of claim 9,
wherein information related to a type of data scheduled by the DCI is obtained based on the equal scrambling sequence.

12. The communication device of claim 9,
wherein information about a type of the DCI is obtained based on indexes of the second DCI candidates related to the DCI.

13. The communication device of claim 9,
wherein the second DCI candidates are generated by attaching a CRC to each of segmented DCIs obtained by segmenting encoded DCI based on a size of each of the second DCI candidates.

14. The communication device of claim 9,
wherein the second DCI candidates are generated by encoding the DCI in which the CRC is included based on a size of each of the second DCI candidates.

15. The communication device of claim 9,
wherein a length of the equal scrambling sequence is a sum of a length of the CRC and a length of a virtual CRC included in a payload of the DCI.

16. The communication device of claim 9,
wherein a physical uplink control channel (PUCCH) resource related to data scheduled by the DCI is determined based on a control RB set having a lowest index among the control RB sets.

17. A method of transmitting downlink control information (DCI) by a base station in a wireless communication system, the method comprising:
segmenting the DCI into a plurality of DCI candidates;
scrambling a cyclic redundancy check (CRC) included in the DCI candidates using an equal scrambling sequence; and
mapping the DCI candidates to a plurality of control resource block (RB) sets and transmitting the DCI candidates,
wherein the equal scrambling sequence is determined based on the number of the DCI candidates.

18. The method of claim 17,
wherein the number of control channel elements (CCEs) constituting each of the DCI candidates is different.

19. The method of claim 17,
wherein indexes of the DCI candidates are determined based on a type of the DCI.

* * * * *